(12) United States Patent
Tomita

(10) Patent No.: US 12,196,936 B2
(45) Date of Patent: Jan. 14, 2025

(54) ATR PRISM

(71) Applicant: Nippon Electric Glass Co., Ltd., Shiga (JP)

(72) Inventor: Mitsuru Tomita, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 157 days.

(21) Appl. No.: 17/900,213

(22) Filed: Aug. 31, 2022

(65) Prior Publication Data

US 2023/0078226 A1 Mar. 16, 2023

(30) Foreign Application Priority Data

Sep. 13, 2021 (JP) .................................. 2021-148796

(51) Int. Cl.
| | |
|---|---|
| *G02B 17/00* | (2006.01) |
| *C03C 3/32* | (2006.01) |
| *G02B 1/02* | (2006.01) |
| *G02B 17/04* | (2006.01) |

(52) U.S. Cl.
CPC ............ *G02B 17/004* (2013.01); *C03C 3/321* (2013.01); *G02B 1/02* (2013.01); *G02B 17/04* (2013.01)

(58) Field of Classification Search
CPC ........ G02B 17/004; G02B 1/02; G02B 17/04; G02B 5/04; G02B 6/4214; G02B 27/0172; G02B 6/425; C03C 3/321; G01N 21/552; G01N 21/3577

See application file for complete search history.

(56) References Cited

U.S. PATENT DOCUMENTS

| | | | |
|---|---|---|---|
| 6,128,091 A * | 10/2000 | Uchida | G01N 21/253 356/300 |
| 6,271,049 B1* | 8/2001 | Auracher | G02B 6/4214 438/22 |
| 6,882,872 B2* | 4/2005 | Uchida | A61B 5/14532 600/316 |
| 8,787,714 B2* | 7/2014 | Morioka | G02B 6/4246 385/35 |

(Continued)

FOREIGN PATENT DOCUMENTS

| | | | | |
|---|---|---|---|---|
| DE | 3830002 A1 * | 3/1990 | | G01N 21/552 |
| JP | 60-098403 | 6/1985 | | |

(Continued)

OTHER PUBLICATIONS

"Development and Applications of Chalcogenide Glass Optical Fibers at NRL" to Aggrawal et al., Journal of Optolectronics and Advanced Materials vol. 4, No. 3, Sep. 2002, p. 665-678.*

(Continued)

*Primary Examiner* — Mohamed K Amara
(74) *Attorney, Agent, or Firm* — Wenderoth, Lind & Ponack, L.L.P.

(57) ABSTRACT

Provided is an ATR prism, including a material having an internal transmittance of 90% or higher at a wavelength falling within a wavelength range of from 8 μm to 10 μm, when the material has a thickness of 2 mm. The ATR prism includes: a first surface including a first totally reflecting surface; a second surface including a second totally reflecting surface; and a recessed portion formed in one of the first surface or the second surface.

9 Claims, 7 Drawing Sheets

(56) References Cited

U.S. PATENT DOCUMENTS

| | | | |
|---|---|---|---|
| 11,988,599 B2* | 5/2024 | Swett | G01N 33/2823 |
| 2003/0109030 A1* | 6/2003 | Uchida | G01N 21/49 |
| | | | 600/316 |
| 2003/0157725 A1* | 8/2003 | Franzen | G01N 21/552 |
| | | | 436/171 |
| 2006/0041195 A1* | 2/2006 | Shioi | A61B 5/682 |
| | | | 600/310 |
| 2007/0086092 A1* | 4/2007 | Jidai | G02B 27/142 |
| | | | 359/583 |
| 2011/0051125 A1* | 3/2011 | Kim | A61B 5/14507 |
| | | | 356/440 |
| 2011/0310383 A1* | 12/2011 | Masson | G01N 21/553 |
| | | | 356/319 |
| 2012/0170023 A1* | 7/2012 | Szobota | G01N 21/552 |
| | | | 356/51 |
| 2015/0219919 A1* | 8/2015 | Ouderkirk | G02B 27/285 |
| | | | 359/489.09 |
| 2019/0369015 A1* | 12/2019 | Ismail | G01N 33/48735 |
| 2020/0096429 A1* | 3/2020 | Andersen | G01N 13/02 |
| 2020/0158637 A1 | 5/2020 | Fujimaki et al. | |
| 2022/0404275 A1 | 12/2022 | Hayashi et al. | |
| 2022/0404361 A1* | 12/2022 | Sabry | G01N 33/56983 |
| 2023/0079647 A1* | 3/2023 | Tomita | G02B 5/04 |
| | | | 359/831 |

FOREIGN PATENT DOCUMENTS

| | | | | |
|---|---|---|---|---|
| JP | 2006081893 A * | 3/2006 | | A61B 5/14532 |
| JP | 2021-74068 | 5/2021 | | |
| WO | WO-9801401 A1 * | 1/1998 | | C03C 13/044 |
| WO | 2018/190358 | 10/2018 | | |
| WO | 2021/131126 | 7/2021 | | |

OTHER PUBLICATIONS

Degraaf et al. "Design and Fabrication of an Infrared Microspectrometer using Attenuated Total Reflection"; 2007 IEEE International Symposium on Industrial Electronics (2007, pp. 1395-1399).*

Office Action issued Oct. 24, 2024 in corresponding Japanese Patent Application No. 2021-148796, with English translation.

* cited by examiner

ATR PRISM

BACKGROUND OF THE INVENTION

1. Field of the Invention

The present invention relates to an ATR prism.

2. Description of the Related Art

An attenuated total reflection (ATR) method is known as a method of non-invasively obtaining biological information such as a blood-sugar level. The ATR method provides an absorption spectrum of a target object by using an evanescent wave. The evanescent wave penetrates into the target object through a totally reflecting surface of an ATR prism arranged in contact with the target object when total reflection occurs in the ATR prism.

2. Description of the Related Art

For example, in Japanese Patent Application Laid-open No. 2021-74068, there is disclosed a measurement device including an ATR prism. The ATR prism has an incident surface, a first totally reflecting surface, a second totally reflecting surface, and an exit surface. The ATR prism causes probe light incident on the incident surface to be repeatedly totally reflected by the first totally reflecting surface and the second totally reflecting surface under a state in which the first totally reflecting surface is held in contact with a living organism. After that, the probe light exits the ATR prism through the exit surface, and is converted into a detection signal by a light detector (see paragraphs [0039] to [0041] of Japanese Patent Application Laid-open No. 2021-74068).

The measurement device includes a first support portion and a second support portion. The first support portion and the second support portion support the ATR prism. The first support portion is a box-shaped member that supports a component such as an optical fiber. The second support portion is a block-shaped member having a recessed portion for allowing the ATR prism to be inserted and fixed thereto (see paragraphs [0170] to [0172] and FIG. 16 of Japanese Patent Application Laid-open No. 2021-74068).

The related-art measurement device has such a configuration in which, when the ATR prism is placed in the recessed portion of the second support portion, the second totally reflecting surface of the ATR prism is brought into contact with a bottom surface of the recessed portion. When the second totally reflecting surface is in contact with another member as described above, the member may obstruct the total reflection of the probe light at the second totally reflecting surface, resulting in lowered light detection accuracy of the ATR prism. In this case, the term "light detection accuracy" refers to a signal-to-noise ratio (SN ratio) of a light component extracted from the exit surface of the ATR prism.

SUMMARY OF THE INVENTION

The present invention has been made in view of the circumstances described above, and has a technical object to prevent reduction in light detection accuracy of an ATR prism.

In order to solve the above-mentioned problem, according to the present invention, there is provided an ATR prism, comprising a material having an internal transmittance of 90% or higher at a wavelength falling within a wavelength range of from 8 μm to 10 μm when the material has a thickness of 2 mm, the ATR prism comprising: a first surface including a first totally reflecting surface; a second surface including a second totally reflecting surface; and a recessed portion formed in one of the first surface or the second surface.

According to the configuration described above, the totally reflecting surface can be formed in the recessed portion formed in the first surface or the second surface. As a result, contact of another member of a measurement device including the ATR prism or a foreign matter such as dust with the totally reflecting surface formed in the recessed portion can be prevented. Thus, desired total reflection can be caused at the totally reflecting surface of the recessed portion. As a result, reduction in light detection accuracy of the ATR prism can be prevented.

According to the present invention, in the ATR prism, the first surface may be a contact surface to be brought into contact with a target to be measured, the second surface may be a non-contact surface being kept in non-contact with the target to be measured, and the recessed portion may be formed in the second surface.

The first surface is brought into contact with the target to be measured, and the total reflection of light at the first totally reflecting surface of the first surface and the second totally reflecting surface of the second surface is repeated to thereby enable the ATR prism to detect information of the target to be measured. The second surface is not brought into contact with the target to be measured, another member of the measurement device, or a foreign matter such as dust. Thus, the ATR prism can obtain the information without reduction in light detection accuracy.

According to the present invention, in the ATR prism, the recessed portion may have a bottom surface, the bottom surface may comprise the second totally reflecting surface, and the ATR prism may further comprise a covering member configured to cover the recessed portion at a position apart from the bottom surface. With the recessed portion covered with the covering member, the second totally reflecting surface in the bottom surface can be protected so as to prevent the contact of another member of the measurement device or a foreign matter such as dust with the second totally reflecting surface.

According to the present invention, in the ATR prism, the material may comprise glass. In this case, the glass may be chalcogenide glass. The chalcogenide glass may contain sulfur at a mole percent falling within a range of from 50% to 80%, antimony at a mole percent larger than 0% and equal to or smaller than 40%, germanium at a mole percent larger than 0% and equal to or smaller than 18%, tin at a mole percent falling within a range of from 0% to 20%, and bismuth at a mole percent falling within a range of from 0% to 20%. Alternatively, the chalcogenide glass may contain tellurium at a mole percent falling within a range of from 4% to 80%, germanium at a mole percent larger than 0% and equal to or smaller than 50%, and gallium at a mole percent falling within a range of from 0% to 20%.

According to the present invention, in the ATR prism, a distance between the bottom surface of the recessed portion and the covering member may be set to fall within a range of from 0.1 mm to 3.0 mm. With this distance, the second totally reflecting surface formed on the bottom surface of the recessed portion can reliably be protected by the covering member.

According to the present invention, in the ATR prism, the recessed portion may comprise wall surfaces surrounding an entire periphery of the bottom surface. With the wall surfaces surrounding the entire periphery of the bottom surface, the contact of a foreign matter with the second totally reflecting surface of the bottom surface can reliably be prevented.

According to the present invention, in the ATR prism, the bottom surface of the recessed portion may have a rectangular shape with four sides, the recessed portion may comprise wall surfaces surrounding the bottom surface, and the wall surfaces may comprise only two wall surfaces corresponding to opposed two sides of the bottom surface.

According to the configuration described above, with the bottom surface of the recessed portion surrounded by only two wall surfaces, the contact of another member of the measurement device with the bottom surface of the recessed portion can be prevented. Further, a distance between the remaining two sides of the bottom surface without wall surfaces can be determined without being restricted by the wall surfaces. As a result, a larger area can be secured for the bottom surface, specifically, for the second totally reflecting surface than in a case in which the entire periphery of the bottom surface is surrounded by the wall surfaces.

According to the present invention, in the ATR prism, a distance between the bottom surface of the recessed portion and the first surface may be set to fall within a range of from 0.1 mm to 3.0 mm. With this distance, total reflection of light at the first totally reflecting surface of the first surface and the second totally reflecting surface of the bottom surface of the recessed portion can effectively be caused.

According to the present invention, reduction in light detection accuracy of the ATR prism can be prevented.

DESCRIPTION OF THE EMBODIMENTS

Embodiments of the present invention are now described with reference to the accompanying drawings. FIG. 1 to FIG. 5 are views for illustrating a measurement device comprising an ATR prism according to a first embodiment and a method of manufacturing an ATR prism.

Figure 1:
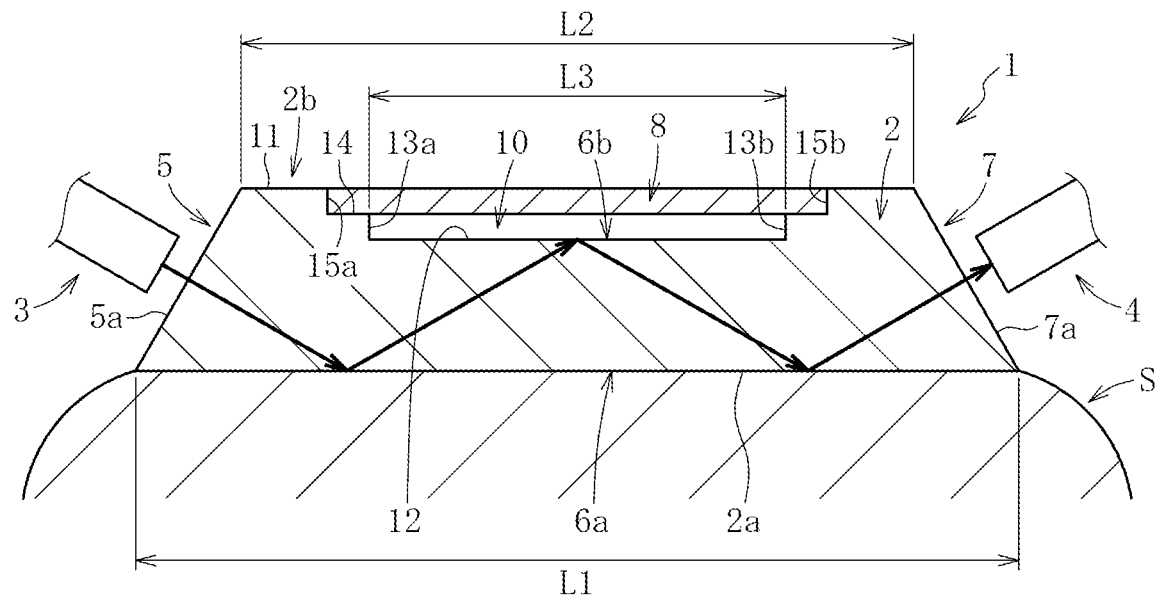
FIG. 1 is a sectional view of a measurement device comprising an ATR prism according to a first embodiment.
Figure 2:
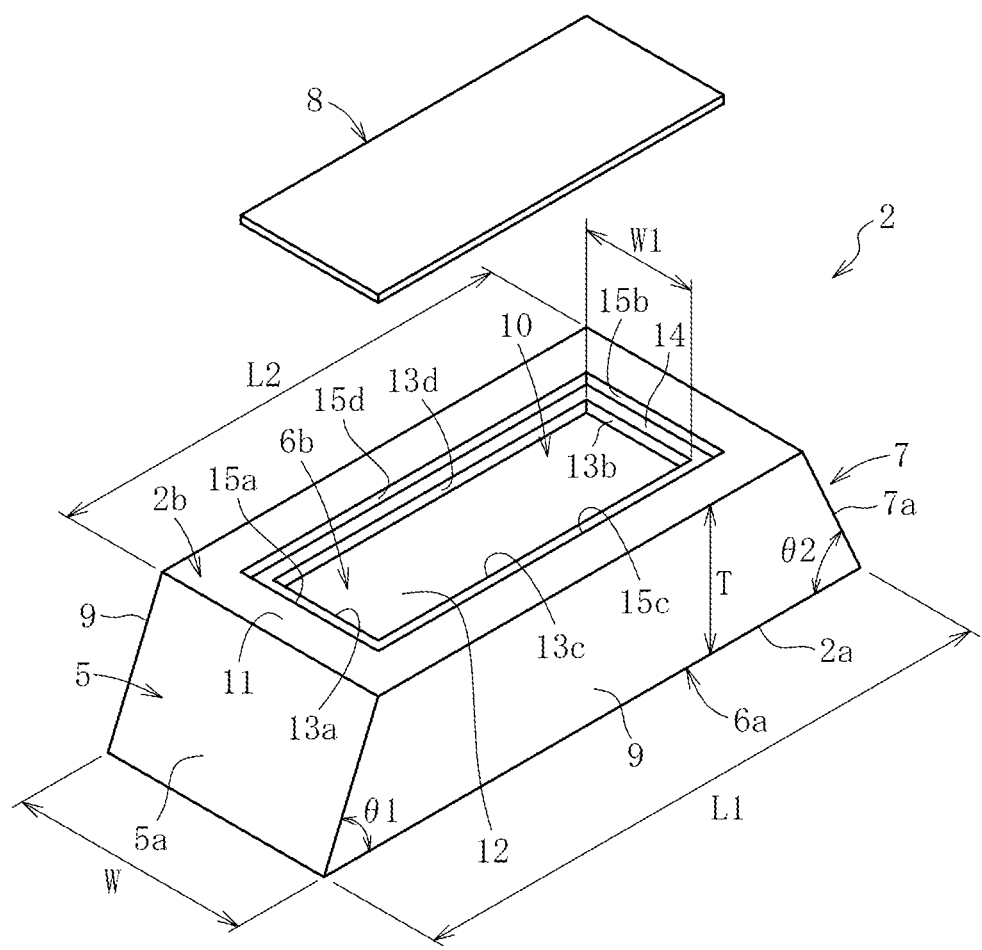
FIG. 2 is an exploded perspective view of the ATR prism.

As illustrated in FIG. 1, a measurement device 1 mainly comprises an ATR prism 2, a light source 3, and a light-receiving part 4. As illustrated in FIG. 1 and FIG. 2, the ATR prism 2 comprises an incident portion 5, reflecting portions 6a and 6b, an exit portion 7, a covering member 8, and side surfaces 9. Light emitted from the light source 3 is incident on the incident portion 5. The reflecting portions 6a and 6b are configured to reflect the incident light. The exit portion 7 allows the light reflected by the reflecting portions 6a and 6b to exit the ATR prism 2. The covering member 8 is configured to cover a part of the reflecting portion 6b. The side surfaces 9 are formed between the incident portion 5 and the exit portion 7.

The incident portion 5 comprises an inclined surface 5a. The inclined surface 5a is inclined with respect to the reflecting portions 6a and 6b. An inclination angle $\theta 1$ of the inclined surface 5a is set to, for example, 45 degrees or 60 degrees. However, the inclination angle $\theta 1$ is not limited to the angles described above, and may be suitably set in accordance with a shape and dimensions of the ATR prism 2.

The reflecting portions 6a and 6b comprise a first reflecting portion 6a and a second reflecting portion 6b. The first reflecting portion 6a is formed on one surface (hereinafter referred to as "first surface") 2a of the ATR prism 2. The second reflecting portion 6b is formed on another surface (hereinafter referred to as "second surface") 2b of the ATR prism 2. The second surface 2b is located on a side opposite to the first surface 2a in a thickness direction (direction indicated by the reference symbol T in FIG. 2; the same applies to the following description) of the ATR prism 2. A length dimension L1 of the first surface 2a is larger than a length dimension L2 of the second surface 2b. Further, an area of the first surface 2a is larger than an area of the second surface 2b.

A width dimension W of each of the first surface 2a and the second surface 2b is set to fall within a range of, for example, from 2 mm to 15 mm, preferably from 3 mm to 12 mm. The length dimension L1 of the first surface 2a (first reflecting portion 6a) of the ATR prism 2 is set to fall within a range of, for example, from 5 mm to 30 mm, preferably from 7 mm to 27 mm. The length dimension L2 of the second surface 2b (second reflecting portion 6b) of the ATR prism 2 is set to fall within a range of, for example, from 3 mm to 20 mm, preferably from 5 mm to 17 mm. A distance between the first surface 2a and the second surface 2b, specifically, a thickness dimension T of the ATR prism 2 is set to fall within a range of, for example, from 1 mm to 10 mm, preferably from 2 mm to 8 mm.

The first reflecting portion 6a comprises a first totally reflecting surface configured to reflect the light introduced from the incident portion 5 into the ATR prism 2. In this embodiment, the first totally reflecting surface is formed on the entire surface of the first surface 2a. However, the first totally reflecting surface is not limited thereto. The first totally reflecting surface may be formed on a part of the first surface 2a. The first totally reflecting surface is a contact surface to be brought into contact with a biological sample (hereinafter referred to simply as "sample") S being a target to be measured.

As illustrated in FIG. 1 and FIG. 2, the second reflecting portion 6b comprises a recessed portion 10 and an exposed surface 11. The recessed portion 10 is covered with the covering member 8. The exposed surface 11 surrounds the recessed portion 10.

The recessed portion 10 comprises a bottom surface 12, first wall surfaces 13a, 13b, 13c, and 13d, a support surface 14, and second wall surfaces 15a, 15b, 15c, and 15d. The first wall surfaces 13a to 13d surround the bottom surface 12. The support surface 14 is configured to support the covering member 8. The second wall surfaces 15a to 15d surround the support surface 14.

The bottom surface 12 comprises a second totally reflecting surface configured to reflect the light introduced from the incident portion 5 into the ATR prism 2. In this embodiment, the entire surface of the bottom surface 12 is formed as the second totally reflecting surface. However, the second totally reflecting surface is not limited thereto. The second totally reflecting surface may be formed on a part of the bottom surface 12. The second totally reflecting surface is a non-contact surface, which is kept in non-contact with the sample S.

As illustrated in FIG. 2, the bottom surface 12 has a rectangular shape with four sides. However, the shape of the bottom surface 12 is not limited to a rectangular shape. A length dimension L3 (see FIG. 1) of the bottom surface 12 is set to fall within a range of, preferably from 1 mm to 19 mm, more preferably from 2 mm to 18 mm. A width dimension W1 of the bottom surface 12 is set to fall within a range of, preferably from 1 mm to 15 mm, more preferably from 1.5 mm to 14 mm.

A distance between the exposed surface 11 and the bottom surface 12, specifically, a depth D (see FIG. 3) of the recessed portion 10 is set to fall within a range of, preferably from 0.5 mm to 5 mm, more preferably from 1 mm to 4 mm. A distance between the bottom surface 12 and the first surface 2a, specifically, a thickness T1 (see FIG. 3) of the ATR prism 2 with the recessed portion 10 is set to fall within a range of preferably from 1 mm to 5 mm, more preferably from 2 mm to 4 mm. When the thickness T1 is set to fall within the above-mentioned range, the ATR prism 2 can maintain strength while enhancing accuracy of a detection signal by increasing the number of times of total reflection of the probe light introduced into the ATR prism 2, which is repeated at the first totally reflecting surface and the second totally reflecting surface.

The first wall surfaces 13a to 13d comprise four wall surfaces that surround the entire periphery (four sides) of the bottom surface 12. The first wall surfaces 13a to 13d are configured to separate the bottom surface 12 and the covering member 8 from each other. The first wall surfaces 13a to 13d are illustrated as being perpendicular to the bottom surface 12. However, a mode of the first wall surfaces 13a to 13d is not limited to that described above. The first wall surfaces 13a to 13d may be inclined at an inclination angle θ3 with respect to the bottom surface 12, as indicated by a long dashed double-dotted line in FIG. 3. When the inclination angle θ3 is set equal to or larger than 60 degrees and smaller than 90 degrees, molded glass can easily be demolded from a second molding die 17 after being annealed and cooled in a molding step described later.

The support surface 14 supports the covering member 18 at a position apart from the bottom surface 12. The support surface 14 is formed in the middle in a depth direction of the recessed portion 10. The support surface 14 is substantially parallel to the bottom surface 12. The support surface 14 has a rectangular shape with four sides. However, the shape of the support surface 14 is not limited to a rectangular shape. The support surface 14 is in contact with a part of the covering member 8 to support the covering member 8.

Figure 3:
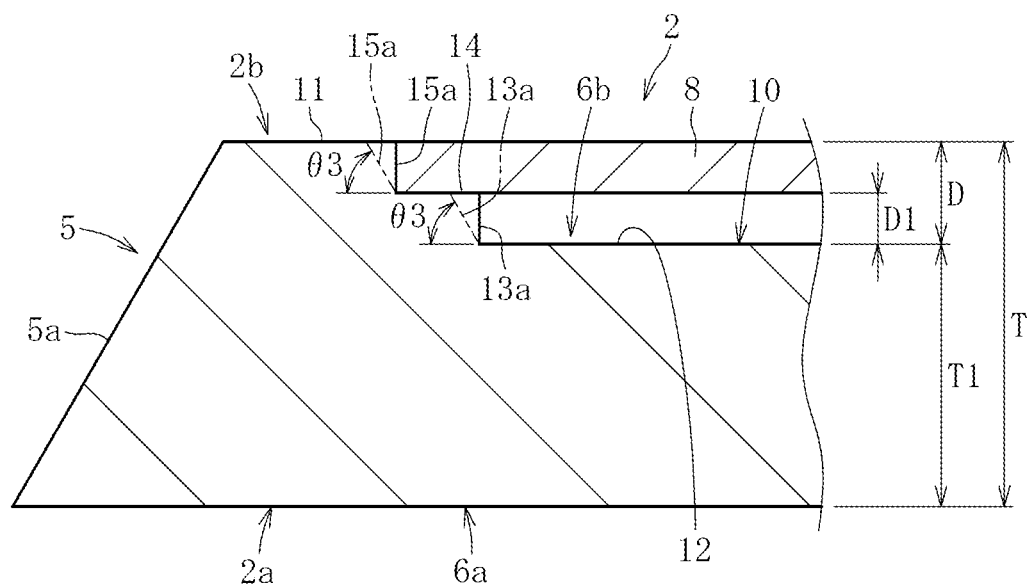
FIG. 3 is a sectional view of the ATR prism.

The second wall surfaces 15a to 15d comprise four wall surfaces that surround the entire periphery (four sides) of the support surface 14. The second wall surfaces 15a to 15d cover end surfaces of the covering member 8 supported on the support surface 14. It is preferred that a length dimension of each of the second wall surfaces 15a to 15d in the thickness direction of the ATR prism be set equal to or smaller than a thickness dimension of the covering member 8. As illustrated in FIG. 3, the second wall surfaces 15a to 15d are not required to be perpendicular to the support surface 14, and may be inclined at the inclination angle θ3 with respect to the support surface 14, as indicated by a long dashed double-dotted line.

The exposed surface 11 is formed so as to surround the entire periphery of the recessed portion 10. The exposed surface 11 has a rectangular shape. However, the shape of the exposed surface 11 is not limited to a rectangular shape. Another component of the measurement device 1 (for example, a support member for the ATR prism 2) may come into contact with the exposed surface 11.

The exit portion 7 comprises an inclined surface 7a. The inclined surface 7a is inclined with respect to the reflecting portions 6a and 6b. An inclination angle θ2 (see FIG. 2) of the inclined surface 7a is set to, for example, 45 degrees or 60 degrees. However, the inclination angle θ2 is not limited to the angles described above, and may be suitably set in accordance with a shape and dimensions of the ATR prism 2.

As illustrated in FIG. 1 and FIG. 2, the covering member 8 is formed of a plate-like member having a rectangular shape with four sides. However, the shape of the covering member 8 is not limited to a rectangular shape. The covering member 8 is formed of, for example, a glass plate. However, the material of the covering member 8 is not limited to glass. The covering member 8 may be formed of a ceramic plate, a resin plate, or a metal plate.

An area of the covering member 8 is larger than an area of the bottom surface 12 of the recessed portion 10 of the ATR prism 2. The thickness dimension of the covering member 8 is set to fall within a range of, preferably from 1 mm to 3 mm, more preferably from 1.5 mm to 2.5 mm. A distance D1 between the covering member 8 and the bottom surface 12 of the recessed portion 10 is set to fall within a range of, preferably from 0.1 mm to 3.0 mm, more preferably from 0.2 mm to 2.5 mm.

The covering member 8 is fixed to the support surface 14 of the recessed portion 10, for example, with an adhesive. The method of fixing the covering member 8 is not limited to that using an adhesive. The covering member 8 may be fixed to the support surface 14 by means such as optical contact or soldering.

The side surfaces 9 separate the incident portion 5 and the exit portion 7 from each other in a longitudinal direction (direction indicated by the reference symbol L1 or L2 in FIG. 1 and FIG. 2; the same applies to the following description) of the ATR prism 2. The side surfaces 9 also separate the first reflecting portion 6a and the second reflecting portion 6b from each other in the thickness direction of the ATR prism 2. Each of angles defined by the side surfaces 9 and the reflecting portions 6a and 6b is set to 90 degrees. However, the angle is not limited to that described in this embodiment.

The ATR prism 2 is made of, for example, a material having an internal transmittance of 90% or higher, preferably 91% or higher, more preferably 92% or higher at a wavelength falling within a range of from 8 μm to 10 μm when the material has a thickness of 2 mm. As the material of the ATR prism 2, for example, a crystal material such as germanium or silicon, or glass may suitably be used.

The glass being the material of the ATR prism may comprise, for example, chalcogenide glass. The chalcogenide glass may contain sulfur at a mole percent falling within a range of from 50% to 80%, antimony at a mole percent larger than 0% and equal to or smaller than 40%, germanium at a mole percent larger than 0% and equal to or smaller than 18%, tin at a mole percent falling within a range of from 0% to 20%, and bismuth at a mole percent falling within a range of from 0% to 20%.

The chalcogenide glass contains S more preferably at 55% or larger and 75% or smaller in mole percentage, further preferably at 60% or larger and 70% or smaller. When glass contains S at a mole percent smaller than 50%, vitrification is difficult. Meanwhile, when glass contains S at a mole percent larger than 80%, glass has low weather resistance, thus restricting the circumstances in which the ATR prism can be used.

The chalcogenide glass contains Sb more preferably at 5% or larger and 35% or smaller in mole percentage, further preferably at 10% or larger and 33% or smaller. When glass contains no Sb or contains Sb at a mole percent larger than 40%, vitrification is difficult.

The chalcogenide glass contains Ge more preferably at 2% or larger and 20% or smaller in mole percentage, further preferably at 4% or larger and 15% or smaller. When glass contains no Ge, vitrification is difficult. Meanwhile, when the glass contains Ge at a mole percent larger than 18%, Ge-based crystal is precipitated from the glass, making it difficult to achieve an internal transmittance that contributes to features of the ATR prism.

The chalcogenide glass contains Sn more preferably at 1% or larger and 15% or smaller in mole percentage, further preferably at 5% or larger and 10% or smaller. Tin (Sn) contained in glass is a component that promotes vitrification. When glass contains Sn at a mole percent larger than 20%, however, vitrification is difficult.

The chalcogenide glass contains Bi more preferably at 0.5% or larger and 10% or smaller in mole percentage, further preferably at 2% or larger and 8% or smaller. Bismuth (Bi) contained in glass is a component that reduces energy required for a raw material to vitrify when the glass melts. Meanwhile, when glass contains Bi at a mole percent larger than 20%, Bi-based crystal is precipitated from glass, making it difficult to achieve an internal transmittance that contributes to the features of the ATR prism.

The chalcogenide glass is not limited to the composition described above, and may contain tellurium at a mole percent falling within a range of from 4% to 80%, germanium at a mole percent larger than 0% and equal to or smaller than 50%, and gallium at a mole percent falling within a range of from 0% to 20%.

The chalcogenide glass contains Te more preferably at 10% or larger and 75% or smaller in mole percentage, further preferably at 20% or larger and 70% or smaller. When glass contains Te at a mole percent smaller than 4%, vitrification is difficult. Meanwhile, when the glass contains Te at a mole percent larger than 80%, Te-based crystal is precipitated from the glass, making it difficult to achieve an internal transmittance that contributes to features of the ATR prism.

The chalcogenide glass contains Ge more preferably at 1% or larger and 40% or smaller in mole percentage, further preferably at 5% or larger and 30% or smaller. When glass contains no Ge, vitrification is difficult. Meanwhile, when the glass contains Ge at a mole percent larger than 50%, Ge-based crystal is precipitated from the glass, making it difficult to achieve an internal transmittance that contributes to features of the ATR prism.

The chalcogenide glass contains Ga more preferably at 0.1% or larger and 15% or smaller in mole percentage, further preferably at 1% or larger and 10% or smaller. Glass containing Ga has a wider vitrification range, resulting in enhanced thermal stability of glass (stability in vitrification).

It is preferred that the glass have an internal transmittance of 10% or higher, more preferably 30% or higher, further preferably 50% or higher at a wavelength falling within a range of from 1 μm to 2 μm when the glass has a thickness of 2 mm so that processing quality, internal quality, or the like of the ATR prism can be checked with use of an optical device using near-infrared light. As a result, the ATR prism having high quality can be obtained.

As illustrated in FIG. 1, the light source 3 is arranged in the vicinity of the incident portion 5 of the ATR prism 2 so as to be opposed to the inclined surface 5a of the incident portion 5. The light source 3 is configured to radiate, for example, infrared light to the incident portion 5 of the ATR prism 2. The light source 3 comprises, for example, an apparatus comprising a quantum-cascade laser configured to emit laser light in an infrared range. However, the light source 3 is not limited to that described in this embodiment. The term "infrared light" here refers to light having a wavelength falling within a range of from 8 μm to 10 μm.

As illustrated in FIG. 1, the light-receiving part 4 is arranged in the vicinity of the exit portion 7 so as to be opposed to the inclined surface 7a of the exit portion 7.

Now, a method of measuring biological information with the measurement device 1 is described. In FIG. 1, light propagating from the light source 3 to the light-receiving part 4 is indicated by a plurality of consecutive arrows. As illustrated in FIG. 1, light (infrared light) emitted from the light source 3 is introduced from the incident portion 5 into the ATR prism 2. The light propagates to the exit portion 7 while being repeatedly reflected (totally reflected) by the first reflecting portion 6a and the second reflecting portion 6b.

When the sample S is in contact with the first reflecting portion 6a, the light is totally reflected by the contact surface of the first reflecting portion 6a of the ATR prism 2, which is in contact with the sample S, instead of exiting the ATR prism 2. In this case, the light penetrates into the sample S by a small distance (evanescent wave). When the penetrating light is absorbed by the sample S, the reflected light is attenuated in accordance with a concentration of a light absorbing substance. Accordingly, an absorption spectrum of a material to be measured, which is contained in the sample 5, can be obtained. An infrared absorption spectrum measured based on the light that has exited the exit portion 7 and has reached the light-receiving part 4 and conditions inside the sample S have a correlation. Accordingly, biological information of the sample 5, such as a blood-sugar level, can be obtained based on the infrared absorption spectrum.

Now, a method of manufacturing the ATR prism 2 having the above-mentioned configuration from glass is described. This method comprises a preparation step of preparing base-material glass and the molding step of molding the base-material glass into the ATR prism 2.

Figure 4:
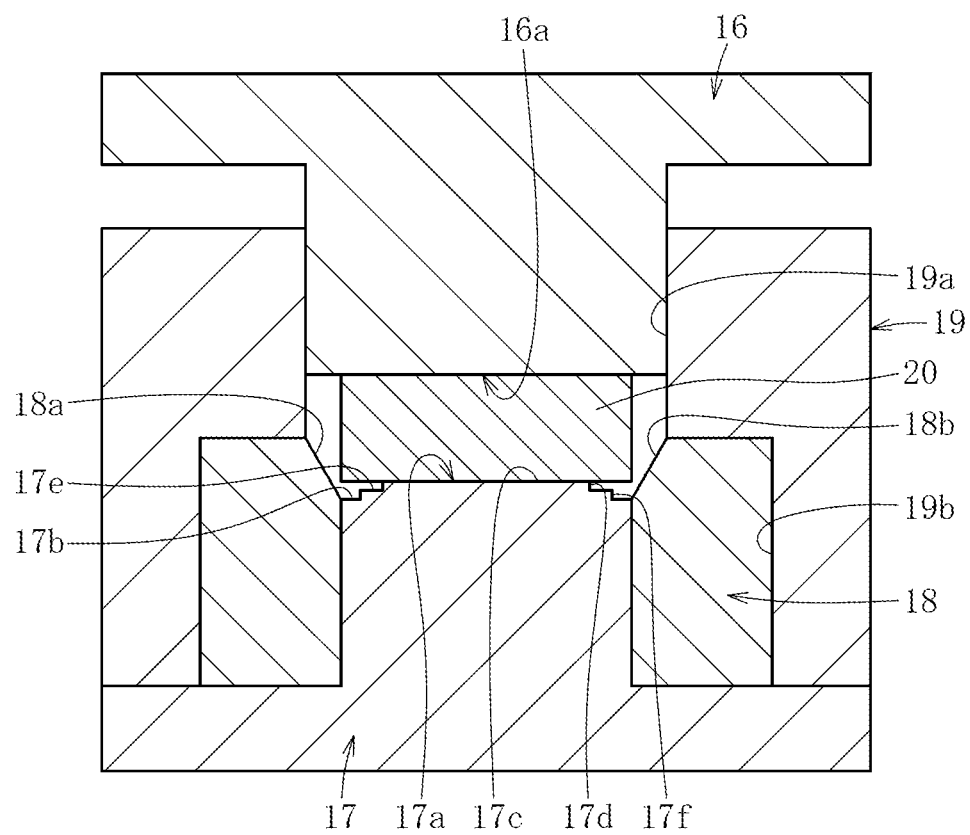
FIG. 4 is a sectional view for illustrating one step of a method of manufacturing the ATR prism.

In the preparation step, for example, base-material glass comprising chalcogenide glass containing S at 60%, Sb at 30%, Ge at 5%, and Sn at 5% in mole percentage as a glass composition or chalcogenide glass containing Te at 70%, Ge at 25%, and Ga at 5% in mole percentage as a glass composition is prepared. As illustrated in FIG. 4, a base-material glass 20 has a rectangular parallelepiped shape. However, the shape of the base-material glass 20 is not limited to a rectangular parallelepiped shape. In the preparation step, the entire surfaces or a part of the surfaces of the base-material glass 20 may be subjected to polishing (mirror finishing).

Figure 5:
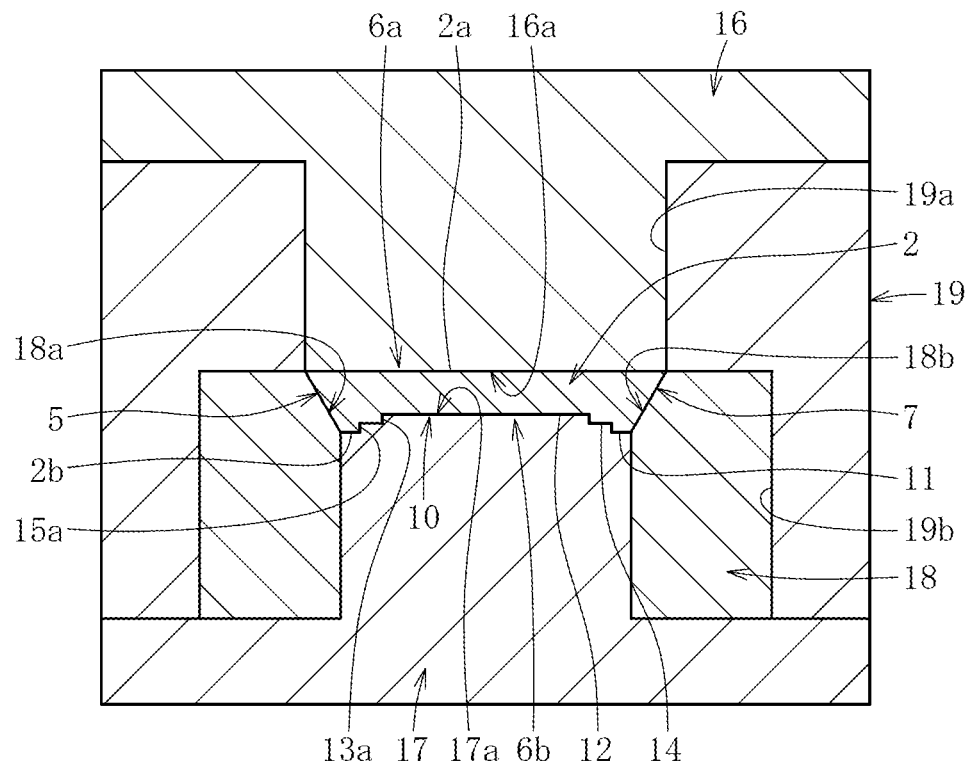
FIG. 5 is a sectional view for illustrating the one step of the method of manufacturing the ATR prism.

In the molding step, the base-material glass 20 is pressed between molding dies while being heated to thereby form the ATR prism 2 by molding. As illustrated in FIG. 4 and FIG. 5, molding dies 16 to 19 used in the molding step comprise a first molding die 16, the second molding die 17, a third molding die 18, and a fourth molding die 19. The molding dies 16 to 19 are made of, for example, a metal such as cemented carbide.

It is preferred that the molding dies 16 to 19 be placed in a chamber made of a metal, which is supplied with an inert gas (for example, a nitrogen gas). A heater configured to heat the molding dies 16 to 19 and the base-material glass 20 is provided outside the chamber.

The first molding die 16 is provided above the second molding die 17. The first molding die 16 comprises a molding surface 16a configured to form the first reflecting portion 6a (first surface 2a) of the ATR prism 2.

The second molding die 17 comprises a molding surface 17a configured to form the second reflecting portion 6b (second surface 2b) of the ATR prism 2. The molding surface 17a comprises an exposed-surface molding portion 17b, a bottom-surface molding portion 17c, a first-wall-surface molding portion 17d, a support-surface molding portion 17e, and a second-wall-surface molding portion 17f. The exposed-surface molding portion 17b is configured to form the exposed surface 11 of the second reflecting portion 6b. The bottom-surface molding portion 17c is configured to form the bottom surface 12 of the recessed portion 10 of the second reflecting portion 6b. The first-wall-surface molding surface 17d is configured to form the first wall surfaces 13a to 13d. The support-surface molding portion 17e is configured to form the support surface 14. The second-wall-surface molding portion 17f is configured to form the second wall surfaces 15a to 15d.

The third molding die 18 has a hollow shape so as to allow a part of the second molding die 17 to be inserted thereinto. The third molding die 18 has a molding surface 18a and a molding surface 18b. The molding surface 18a is configured to form, the inclined surface 5a of the incident portion 5 of the ATR prism 2. The molding surface 18b is configured to form the inclined surface 7a of the exit portion 7. In addition, the third molding die 18 comprises molding surfaces (not shown) configured to form the side surfaces 9 of the ATR prism 2.

The fourth molding die 19 has a hollow shape, and comprises a first hollow portion 19a and a second hollow portion 19b. A part of the first molding die 16 is inserted into the first hollow portion 19a. The third molding die 18 is inserted into the second hollow portion 19b. The first hollow portion 19a of the fourth molding die 19 functions as a guide portion configured to allow vertical movement of the first molding die 16 under a state in which a part of the first molding die 16 is inserted into the first hollow portion 19a.

In the molding step, the base-material glass 20 is placed on the molding surface 17a of the second molding die 17. Next, the first molding die 16 inserted into the first hollow portion 19a of the fourth molding die 19 is lowered and brought closer to the second molding die 17. Subsequently, the base-material glass 20 is pressed between the first molding die 16 and the second molding die 17 while the molding dies 16 to 19 and the base-material glass 20 are being heated by the heater.

In the molding step, the base-material glass 20 is heated to a temperature falling within a range of, for example, from 160° C. to 260° C. The heated base-material glass 20 softens, and is deformed under pressure applied from the first molding die 16. The molding surfaces 16a, 17a, 18a, and 18b and the molding surfaces (not shown) of the first molding die 16 to the third molding die 18 are brought into contact with the softened base-material glass 20 to thereby form the incident portion 5, each of the reflecting portions 6a and 6b, the exit portion 7, and the side surfaces 9 of the ATR prism 2 (see FIG. 5). After that, temperature of the molding dies 16 to 19 is lowered so as to anneal and cool the molded glass. As a result, the ATR prism 2 is completed.

Now, a method of manufacturing the ATR prism 2 from a crystal material is described. This method comprises a preparation step and a processing step. In the preparation step, a base material comprising a crystal material is prepared. In the processing step, the base material is processed. The processing step comprises, for example, a grinding step and a polishing step. In the griding step, the base material is ground. In the polishing step following the griding step, the base material is polished. The processing step is not limited to that described above. The processing step may comprise an etching step in which an etching treatment is performed on the base material.

In the ATR prism 2 according to the present invention described above, the recessed portion 10 of the second reflecting portion 6b is formed in the second surface 2b, and the recessed portion 10 is covered with the covering portion 8. With this configuration, the contact of, for example, a component of the measurement device 1 in which the ATR prism 2 is mounted or a foreign matter such as dust with the second totally reflecting surface of the bottom surface 12 of the recessed portion 10 can be prevented. As a result, reduction in light detection accuracy (SN ratio) of the ATR prism 2 can be prevented.

FIG. 6 to FIG. 9 are views for illustrating a second embodiment of the present invention. An ATR prism 2 according to the second embodiment comprises an incident portion 5, an exit portion 7, a first reflecting portion 6a, a second reflecting portion 6b, a third reflecting portion 6c, and a fourth reflecting portion 6d.

The incident portion 5 and the exit portion 7 are provided at a part of an exposed surface 11 of a second surface 2b of the ATR prism 2. Specifically, in the second embodiment, the incident portion 5, the second reflecting portion 6b, and the exit portion 7 are provided on the same second surface 2b.

Figure 6:
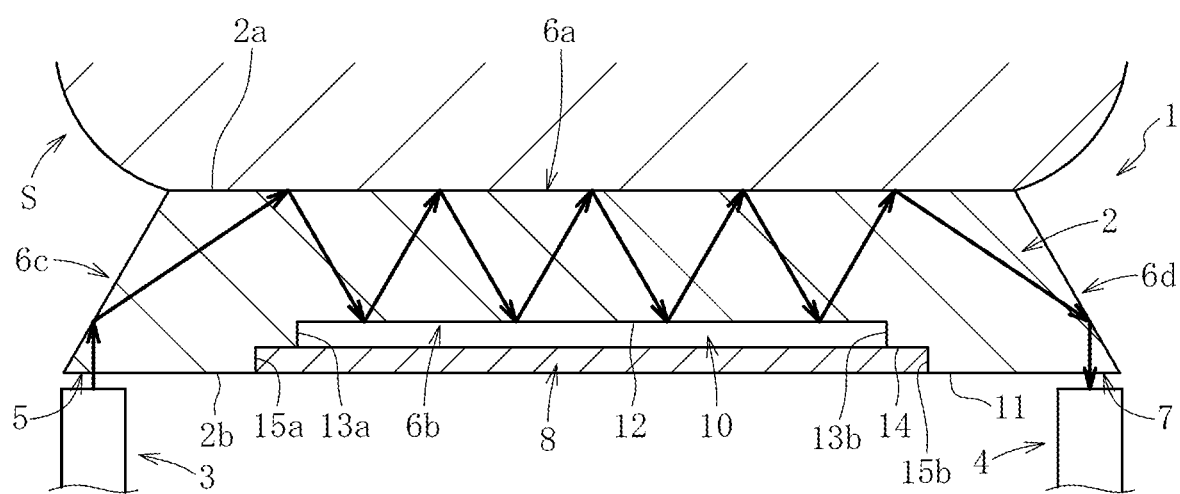
FIG. 6 is a sectional view of a measurement device comprising an ATR prism according to a second embodiment.
Figure 7:
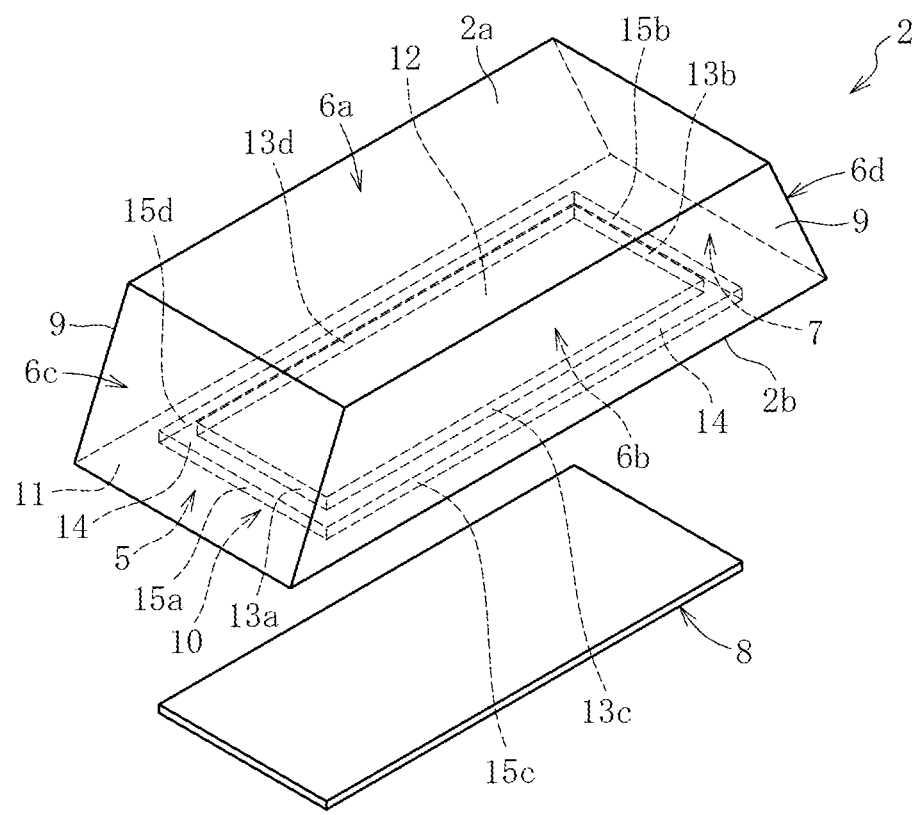
FIG. 7 is an exploded perspective view of the ATR prism.
Figure 8:
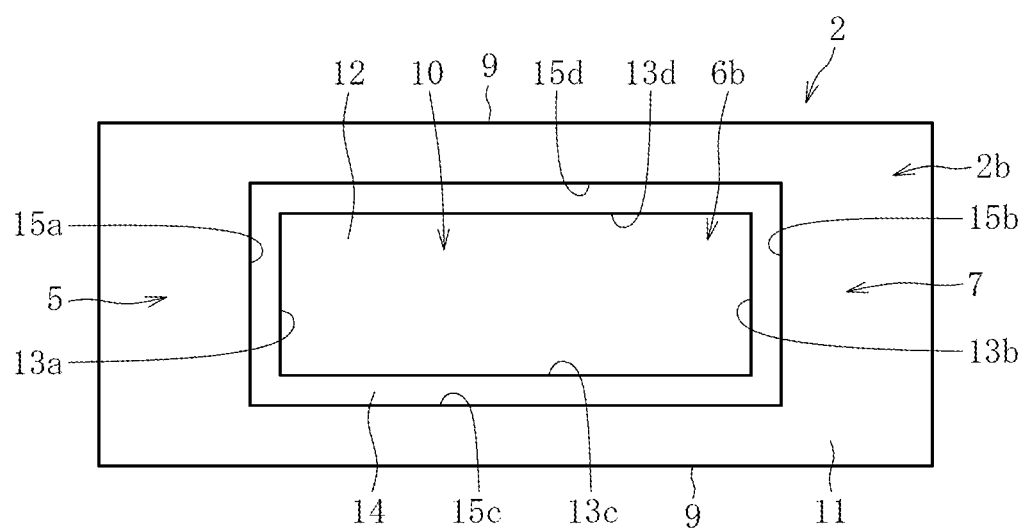
FIG. 8 is a bottom view of the ATR prism.

As illustrated in FIG. 6 to FIG. 8, the incident portion 5 does not have the inclined surface 5a of the ATR prism 2 according to the first embodiment. The incident portion 5 is provided at a part of one end portion of the exposed surface 11 of the second surface 2b in a longitudinal direction. The exit portion 7 does not have the inclined surface 7a of the ATR prism 2 according to the first embodiment. The exit portion 7 is provided at a part of another end portion of the exposed surface 11 of the second surface 2b in the longitudinal direction.

The first reflecting portion 6a is formed on the entire surface of the first surface 2a of the ATR prism 2 as in the first embodiment. The second reflecting portion 6b is formed on the second surface 2b of the ATR prism 2 as in the first embodiment.

The third reflecting portion 6c comprises a reflecting surface that is inclined with respect to the first reflecting portion 6a and the second reflecting portion 6b. An inclination angle of the reflecting surface is set to 45 degrees or 60 degrees, but is not limited to these angles. The reflecting surface (inclined surface) reflects light, which has been introduced from the incident portion 5 into the ATR prism 2, toward the first reflecting portion 6a.

The fourth reflecting portion 6d comprises a reflecting surface (inclined surface) that is inclined with respect to the first reflecting portion 6a and the second reflecting portion 6b. An inclination angle of the reflecting surface is set to 45 degrees or 60 degrees, but is not limited to these angles. The reflecting surface (inclined surface) reflects the light, which has been repeatedly reflected (totally reflected) by the first reflecting portion 6a and the second reflecting portion 6b, toward the exit portion 7.

As illustrated in FIG. 6, the light introduced from the incident portion 5 into the ATR prism 2 is reflected by the third reflecting portion 6c and travels toward the first reflecting portion 6a. Subsequently, the light is reflected by the first reflecting portion 6a and travels toward the second reflecting portion 6b.

After that, the light is repeatedly totally reflected by the first reflecting portion 6a and the second reflecting portion 6b. Next, after being reflected by the first reflecting portion 6a and the fourth reflecting portion 6d, the light exits the ATR prism 2 from the exit portion 7 and reaches a light-receiving portion 4.

Figure 9:
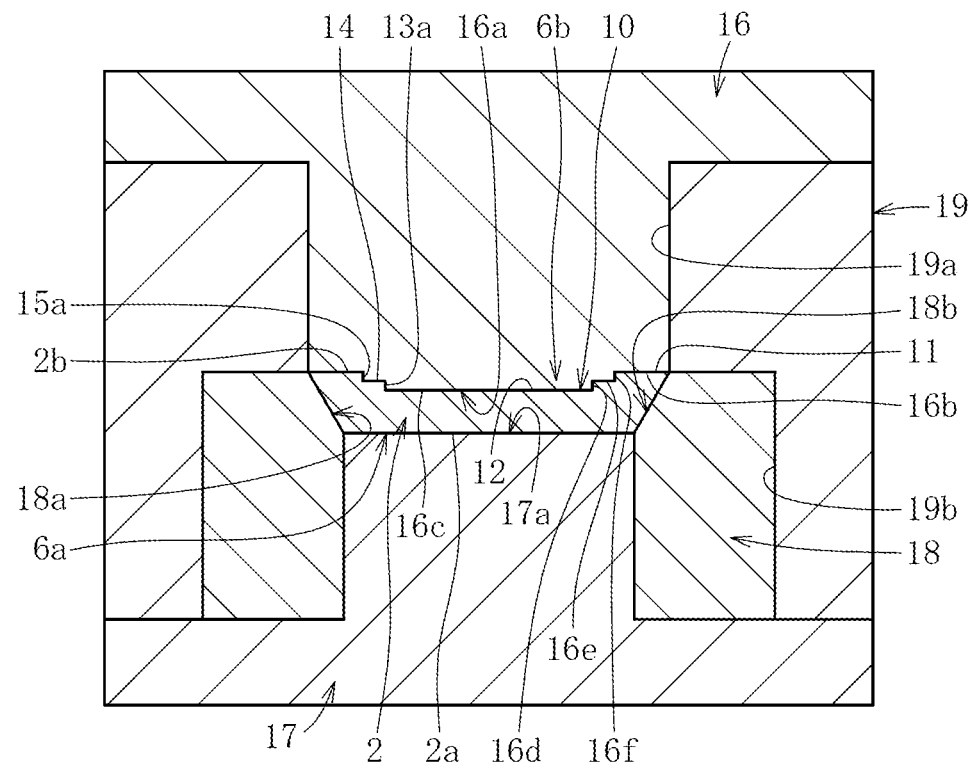
FIG. 9 is a sectional view for illustrating one step of a method of manufacturing the ATR prism.

As illustrated in FIG. 9, in a method of manufacturing the ATR prism 2 according to the second embodiment, in the molding step, the incident portion 5, the second reflecting portion 6b, and the exit portion 7 of the ATR prism 2 is formed by a molding surface 16a of a first molding die 16.

The molding surface 16a of the first molding die 16 comprises an exposed-surface molding portion 16b, a bottom-surface molding portion 16c, a first-wall-surface molding portion 16d, a support-surface molding portion 16e, and a second-wall-surface molding portion 16f. The exposed-surface molding portion 16b is configured to form the exposed surface 11 (comprising the incident portion 5 and the exit portion 7) of the second reflecting portion 6b. The bottom-surface molding portion 16c is configured to form a bottom surface 12 of the recessed portion 10 of the second reflecting portion 6b. The first-wall-surface molding surface 16d is configured to form first wall surfaces 13a to 13d. The support-surface molding portion 16e is configured to form a support surface 14. The second-wall-surface molding portion 16f is configured to form second wall surfaces 15a to 15d.

Further, in the molding step, the first reflecting portion 6a of the ATR prism 2 is formed by a molding surface 17a of a second molding die 17. Still further, the third reflecting portion 6c and the fourth reflecting portion 6d of the ATR prism 2 are formed by molding surfaces 18a and 18b of a third molding die 18. Still further, side surfaces 9 of the ATR prism 2 are formed by molding surfaces (not shown) of the third molding die 18, as in the first embodiment.

Other configurations of the ATR prism 2 and the method of manufacturing the ATR prism 2 in the second embodiment are the same as those of the ATR prism 2 and the method of manufacturing the ATR prism 2 in the first embodiment. In the second embodiment, the same components as those in the first embodiment are denoted by the same reference symbols.

Figure 10:
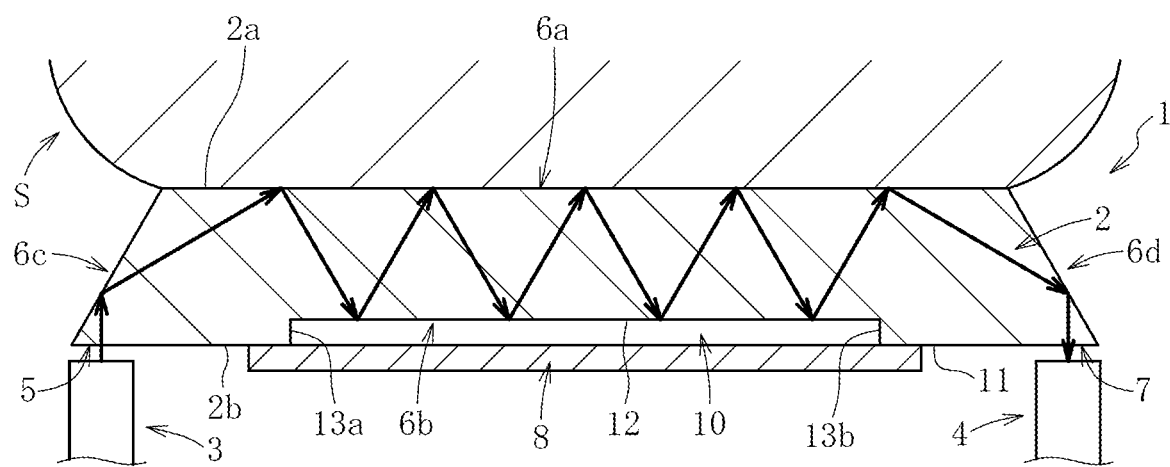
FIG. 10 is a sectional view of a measurement device comprising an ATR prism according to a third embodiment.

FIG. 10 is a view for illustrating a third embodiment of the present invention. An ATR prism 2 according to the third embodiment is different from the ATR prism 2 according to the second embodiment in configuration of a recessed portion 10. The recessed portion 10 of the ATR prism 2 comprises only a bottom surface 12 and wall surfaces (first wall surfaces 13a to 13d) that surround the bottom surface 12, and does not comprise the support surface 14 and second wall surfaces 15a to 15d of the ATR prism 2 according to the first embodiment. A part of a covering member 8 is fixed to a part of an exposed surface 11. Specifically, the part of the exposed surface 11 functions as a support surface configured to support the covering member 8.

Other configurations of the ATR prism 2 and the method of manufacturing the ATR prism 2 in the third embodiment are the same as those of the ATR prism 2 and the method of manufacturing the ATR prism 2 in the second embodiment. In the third embodiment, the same components as those in the second embodiment are denoted by the same reference symbols.

Figure 11:
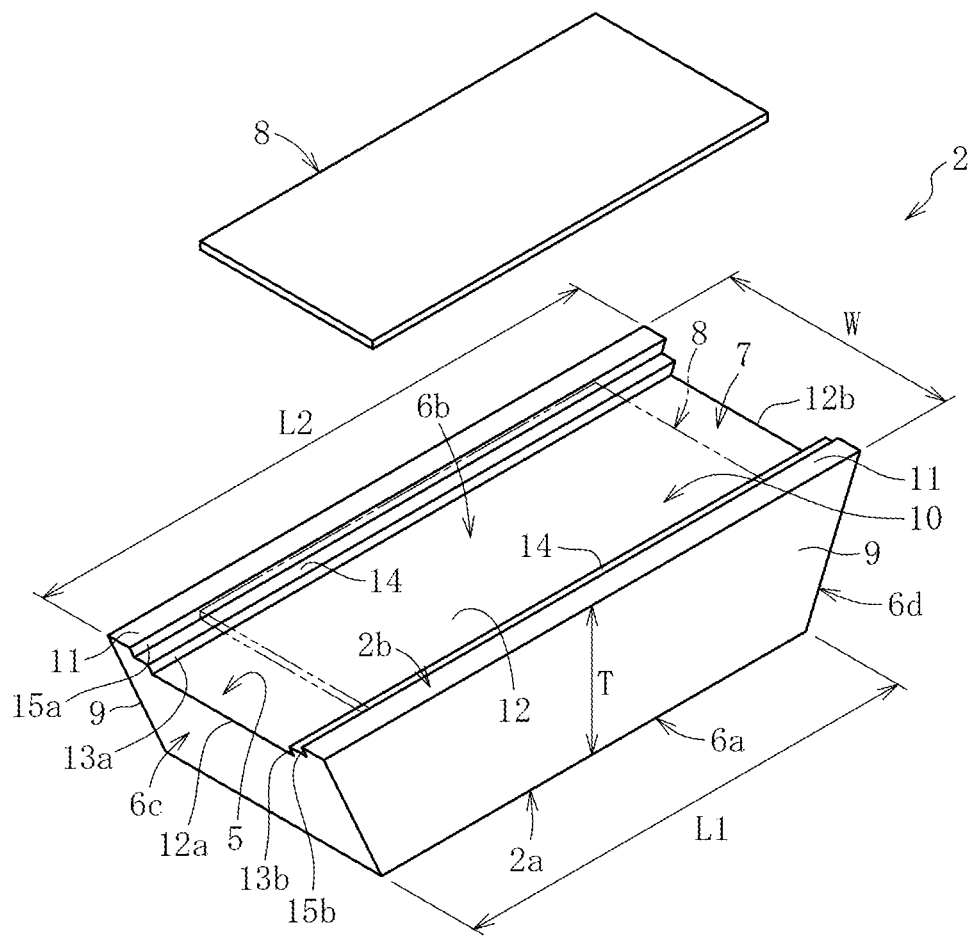
FIG. 11 is an exploded perspective view of an ATR prism according to a fourth embodiment.
Figure 12:
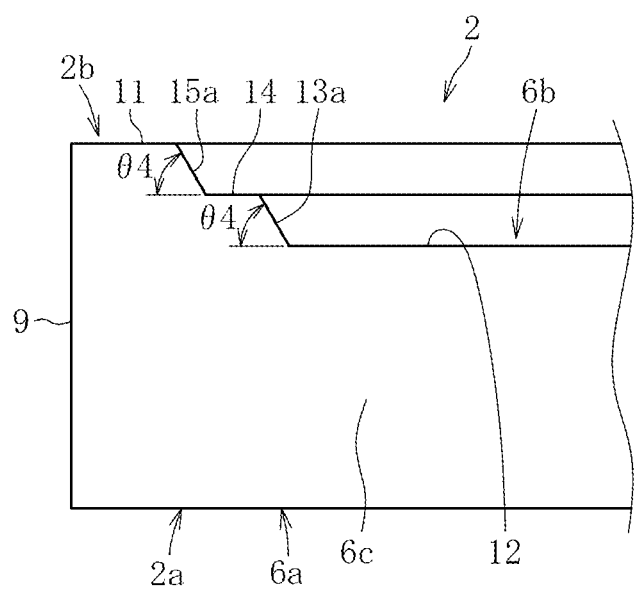
FIG. 12 is a partially enlarged side view of the ATR prism.

FIG. 11 and FIG. 12 are views for illustrating a fourth embodiment of the present invention. An ATR prism 2 according to the fourth embodiment is different from the ATR prism 2 according to the second embodiment in configuration of a recessed portion 10.

In the second embodiment, the recessed portion 10 of the ATR prism 2 comprises four wall surfaces 13a to 13d that surround the entire periphery of the bottom surface 12. However, the recessed portion 10 according to the fourth embodiment comprises only two first wall surfaces 13a and 13b formed so as to correspond to two opposed sides of a bottom surface 12 having a rectangular shape. The first wall surfaces 13a and 13b are opposed to each other. Each of the first wall surfaces 13a and 13b extends in parallel to side surfaces 9 of the ATR prism 2, specifically, has an elongated shape extending in a longitudinal direction of the ATR prism 2. The first wall surfaces 13a and 13b corresponding to two opposed sides of the bottom surfaces 12 are not required to be perpendicular to the bottom surface 12, and may be inclined at an inclination angle θ4 with respect to the bottom surface 12, as illustrated in FIG. 12. The inclination angle θ4 is set to be equal to or larger than 60 degrees and smaller than 90 degrees. Such an inclination angle θ4 enables easy demolding of molded glass from a first molding die 16 (see the second embodiment) after the molded glass is annealed and cooled in the molding step described above.

The bottom surface 12 of the recessed portion 10 has a rectangular shape with four sides. One side 12a of the four sides, which is contiguous with a third reflecting portion 6c, is exposed to an outside, and another side 12b, which is contiguous with a fourth reflecting portion 6d, is also exposed to the outside. Specifically, the bottom surface 12 of the recessed portion 10 has an elongated shape extending from the third reflecting portion 6c to the fourth reflecting portion 6d.

A length of a covering member 8 is shorter than a length of the bottom surface 12. As a result, end portions of the bottom surface 12 in a longitudinal direction are not covered with the covering member 8, and are exposed. The exposed end portions of the bottom surface 12 comprise an incident portion 5 and an exit portion 7, respectively.

In addition to the above-mentioned configuration, the recessed portion 10 comprises two exposed surfaces 11, two second wall surface 15a and 15b, and two support surfaces 14. The second wall surface 15a and 15b are formed so as to correspond to the first wall surfaces 13a and 13b, respectively. The support surfaces 14 are formed between the first wall surface 13a and the second wall surface 15a and between the first wall surface 13b and the second wall surface 15b, respectively. The second wall surfaces 15a and 15b corresponding to the two first wall surfaces 13a and 13b are not required to be perpendicular to the support surfaces 14. As illustrated in FIG. 12, the second wall surfaces 15a and 15b may be inclined at the inclination angle θ4 with respect to the support surfaces 14.

According to the ATR prism 2 of the fourth embodiment, with only two first wall surfaces 13a and 13b surrounding the bottom surface 12, a large distance can be secured between two sides 12a and 12b of the bottom surface 12 without first wall surfaces. Accordingly, a larger area can be secured for the second reflecting surface of the bottom surface 12 as compared to an area of the second reflecting surface in the second embodiment.

Other configurations of the ATR prism 2 and the method of manufacturing the ATR prism 2 in the fourth embodiment are the same as those of the ATR prism 2 and the method of manufacturing the ATR prism 2 in the second embodiment. In the fourth embodiment, the same components as those in the second embodiment are denoted by the same reference symbols.

Figure 13:
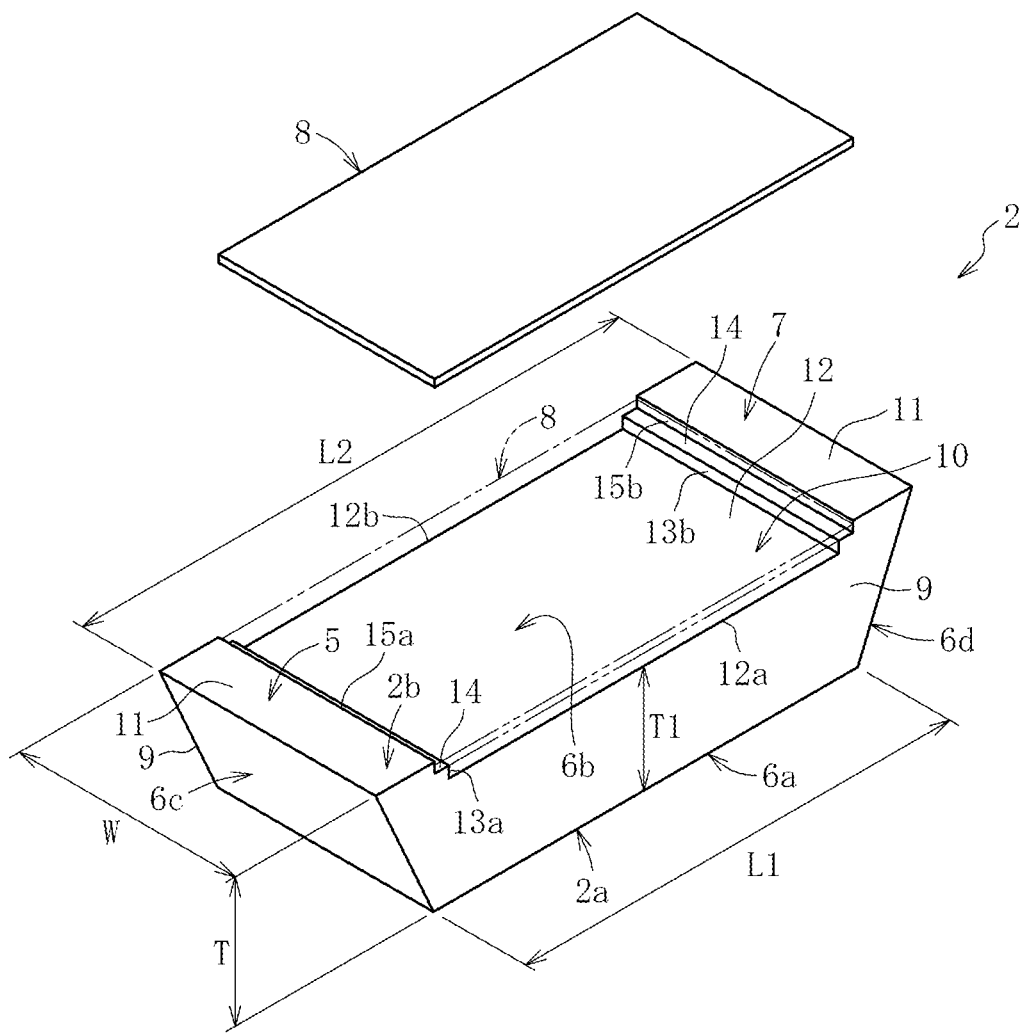
FIG. 13 is an exploded perspective view of an ATR prism according to a fifth embodiment.
Figure 14:
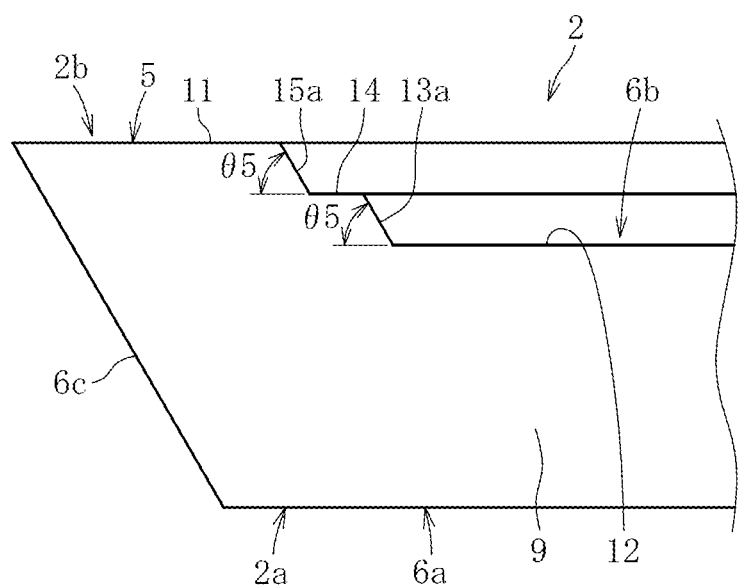
FIG. 14 is a partially enlarged side view of the ATR prism.

FIG. 13 and FIG. 14 are views for illustrating a fifth embodiment of the present invention. An ATR prism 2 according to the fifth embodiment is different from the ATR prism 2 according to the second embodiment in configuration of a recessed portion 10.

In the second embodiment, the recessed portion 10 comprises four wall surfaces 13a to 13d that surround the bottom surface 12. However, the recessed portion 10 according to the fifth embodiment comprises only two first wall surfaces 13a and 13b formed so as to correspond to two opposed sides of a bottom surface 12 having a rectangular shape. The first wall surfaces 13a and 13b are opposed to each other. One first wall surface 13a of the two first wall surfaces 13a and 13b is located closer to a third reflecting portion 6c, and another first wall surface 13b is located closer to a fourth reflecting portion 6d. Each of the two first wall surfaces 13a and 13b has an elongated shape extending in a width direction (direction indicated by the reference symbol W) of the ATR prism 2. The two first wall surfaces 13a and 13b corresponding to two opposed sides of the bottom surfaces 12 are not required to be perpendicular to the bottom surface 12, and may be inclined at an inclination angle θ5 with respect to the bottom surface 12, as illustrated in FIG. 14. The inclination angle θ5 is set to be equal to or larger than 60 degrees and smaller than 90 degrees. Such an inclination angle θ5 enables easy demolding of molded glass from a first molding die 16 (see the second embodiment) after the molded glass is annealed and cooled in the molding step described above.

Four sides of the bottom surface 12 having a rectangular shape in the recessed portion 10 comprise one side 12a and another side 12b. The one side 12a, which is contiguous with one side surface 9 of the ATR prism 2, is exposed to an outside. The another side 12b, which is contiguous with another side surface 9, is exposed to the outside. As a result, in the ATR prism 2, a larger area can be secured for the bottom surface 12 (second reflecting surface) as compared to an area of the bottom surface of the ATR prism 2 according to the second embodiment.

In addition to the above-mentioned configuration, the recessed portion 10 comprises two exposed surfaces 11, two second wall surface 15a and 15b, and two support surfaces 14. The second wall surface 15a and 15b are formed so as to correspond to the first wall surfaces 13a and 13b, respectively. The support surfaces 14 are formed between the first wall surface 13a and the second wall surface 15a and between the first wall surface 13b and the second wall surface 15b, respectively. The two second wall surfaces 15a and 15b corresponding to the two first wall surfaces 13a and 13b are not required to be perpendicular to the support surfaces 14. As illustrated in FIG. 14, the two second wall surfaces 15a and 15b may be inclined at the inclination angle θ5 with respect to the support surfaces 14.

Other configurations of the ATR prism 2 and the method of manufacturing the ATR prism 2 in the fifth embodiment are the same as those of the ATR prism 2 and the method of manufacturing the ATR prism 2 in the second embodiment. In the fifth embodiment, the same components as those in the second embodiment are denoted by the same reference symbols.

The present invention is not limited to the configurations of the above-mentioned embodiments. In addition, the action and effect of the present invention are not limited to those described above. The present invention may be modified in various forms within the range not departing from the spirit of the present invention.

In the second to fifth embodiments described above, the ATR prism 2 comprising the incident portion 5 and the exit portion 7, which are formed integrally with the second reflecting portion 6b, has been described as an example. However, the incident portion 5 and the exit portion 7 of the ATR prism 2 are not limited to those described above. The incident portion 5 and the exit portion 7 may be formed integrally with another reflecting portion.

An anti-reflection film may be provided on each of surfaces of the incident portion 5 and the exit portion 7 in the embodiments described above.

In the embodiments described above, the ATR prism 2 comprising the recessed portion 10 covered with the covering member 8 has been described as an example. However, the configuration of the ATR prism 2 according to the present invention is not limited to that described above. The ATR prism 2 may be incorporated into the measurement device 1 without being covered with the covering member 8. For example, when the ATR prism 2 is supported by a support member of the measurement device 1, the support member may be brought into contact with a part (area excluding the reflecting surface) of the exposed surface of the second surface 2b.

The recessed portion 10 of the ATR prism 2 according to the fourth embodiment and the fifth embodiment may be formed in the ATR prism 2 according to the first embodiment.

In the embodiments described above, the ATP prism 2 comprising the recessed portion 10 formed in the second surface 2b has been described as an example. However, the configuration of the ATR prism 2 according to the present invention is not limited to that described above. The recessed portion 10 may be formed in the first surface 2a. In this case, the second surface 2b serves as a contact surface to be brought into contact with the sample S, and the first surface 2a serves as a non-contact surface, which is kept in non-contact with the sample S.

What is claimed is:

1. An attenuated total reflection (ATR) prism comprising:
    a material having an internal transmittance of 90% or higher at a wavelength falling within a wavelength range of from 8 µm to 10 µm when the material has a thickness of 2 mm;
    a first surface including a first totally reflecting surface;
    a second surface including a second totally reflecting surface;
    a recessed portion formed in the second surface; and
    a covering member,
    wherein the first surface is a contact surface to be brought into contact with a target to be measured,
    wherein the second surface is a non-contact surface being kept in non-contact with the target to be measured, wherein the recessed portion has a bottom surface, wherein the bottom surface comprises the second totally reflecting surface, and wherein the covering member is configured to cover the recessed portion at a position apart from the bottom surface.

2. The ATR prism according to claim 1, wherein the material comprises glass.

3. The ATR prism according to claim 2, wherein the glass comprises chalcogenide glass.

4. The ATR prism according to claim 3, wherein the chalcogenide glass contains sulfur at a mole percent falling within a range of from 50% to 80%, antimony at a mole percent larger than 0% and equal to or smaller than 40%, germanium at a mole percent larger than 0% and equal to or smaller than 18%, tin at a mole percent falling within a range of from 0% to 20%, and bismuth at a mole percent falling within a range of from 0% to 20%.

5. The ATR prism according to claim 3, wherein the chalcogenide glass contains tellurium at a mole percent falling within a range of from 4% to 80%, germanium at a mole percent larger than 0% and equal to or smaller than 50%, and gallium at a mole percent falling within a range of from 0% to 20%.

6. The ATR prism according to claim 1, wherein a distance between the bottom surface of the recessed portion and the covering member is set to fall within a range of from 0.1 mm to 3.0 mm.

7. The ATR prism according to claim 1, wherein the recessed portion comprises wall surfaces surrounding an entire periphery of the bottom surface.

8. The ATR prism according to claim 1, wherein the bottom surface of the recessed portion has a rectangular shape with four sides, wherein the recessed portion comprises wall surfaces surrounding at least a part of the bottom surface, and wherein the wall surfaces comprise only two wall surfaces corresponding to opposed two sides of the bottom surface.

9. The ATR prism according to claim 1, wherein a distance between the bottom surface of the recessed portion and the first surface is set to fall within a range of from 0.1 mm to 3.0 mm.

* * * * *